United States Patent
Godil et al.

(10) Patent No.: US 8,676,849 B2
(45) Date of Patent: Mar. 18, 2014

(54) STORING LOSSLESS TRANSFORMS OF DATA

(75) Inventors: Hasrat Godil, Bellevue, WA (US); Daron Spektor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 12/403,303

(22) Filed: Mar. 12, 2009

(65) Prior Publication Data

US 2010/0235325 A1    Sep. 16, 2010

(51) Int. Cl.
*G06F 17/30* (2006.01)

(52) U.S. Cl.
USPC .......... 707/791; 707/607; 707/608; 707/609; 707/687

(58) Field of Classification Search
USPC ............ 707/600–899; 725/105; 382/239, 233
See application file for complete search history.

(56) References Cited

U.S. PATENT DOCUMENTS

| | | | |
|---|---|---|---|
| 5,838,377 A | 11/1998 | Greene | |
| 5,926,576 A | 7/1999 | Newton | |
| 6,499,045 B1 | 12/2002 | Turney et al. | |
| 7,050,639 B1 * | 5/2006 | Barnes et al. | 382/239 |
| 7,245,769 B2 * | 7/2007 | Temizel et al. | 382/233 |
| 7,257,832 B2 * | 8/2007 | Beane et al. | 725/105 |
| 2004/0044665 A1 * | 3/2004 | Nwabueze | 707/9 |
| 2006/0285760 A1 | 12/2006 | Malvar | |
| 2008/0168111 A1 | 7/2008 | Lyon | |
| 2008/0198935 A1 | 8/2008 | Srinivasan et al. | |

OTHER PUBLICATIONS

Urriza, I. et al., "VLSI Architecture for Lossless Compression of Medical Images using the Discrete Wavelet Transform," University of Zaragoze, Zaragoza, Spain, http://ieeexplore.ieee.org/stamp/stamp.jsp? arnumber=00655857, downloaded Dec. 17, 2008, 6 pages.
"Reviews and Testimonials—Better JPEG," http://www.betterjpeg.com/testimonials.htm, downloaded Dec. 18, 2008, 5 pages.

* cited by examiner

*Primary Examiner* — Isaac M Woo

(74) *Attorney, Agent, or Firm* — Sung Kim; Andrew Sanders; Micky Minhas

(57) ABSTRACT

Techniques and environments that increase the convenience, efficiency and variety of cloud services are offered to clients. User data having an original representational format is losslessly transformed to form one or more alternate renditions having various representational formats based on the lossless transforms. The renditions, which may be pre-generated, can be stored on a network server instead of the identical user data to thereby reduce redundant computation and storage costs. In some cases both the renditions and the original use data may be stored. The original user data may be reconstructed, recreated, or restored using the alternate renditions.

18 Claims, 5 Drawing Sheets

STORING LOSSLESS TRANSFORMS OF DATA

BACKGROUND

Cloud computing is a rapidly growing area in which the Internet (i.e., the "cloud") is used to deliver a variety of services to clients. That is, in cloud computing resources are provided as a service over the Internet in order to satisfy the computing needs of users. Examples of services that can be provided through a cloud are wide-reaching. Compute facilities provide computational services so that users can use central processing unit (CPU) cycles without buying computers. Storage services provide a way to store or backup data and documents without having to continually grow farms of storage networks and servers. Software as a service (SaaS) companies offer software that is owned, delivered, and managed remotely by one or more providers so users can manage their work without buying software. SaaS also allows a sharing of application processing and storage resources in a one-to-many environment, on a pay-for-use basis, or on a subscription basis.

Cloud-based computing offers a number of advantages over more traditional computing arrangements in which the applications and computing resources must be installed and run on the customer's own computer. For example, cloud computing can lower capital expenditures since the computing infrastructure can be largely owned (and maintained) by the provider and does not need to be purchased for one-time or infrequent but intensive computing tasks. In addition, users can access their applications and data from any location, independent of the device they are working on. Since applications and data can be stored and maintained on multiple redundant sites, reliability can be substantially increased.

As cloud services mature, more and more people rely on them for all sorts of day-to-day activities such as communicating with others, sharing files and photos, blogging, collaborating, organizing schedules with online calendars, entertainment, synchronizing data between devices, and online data storage. One problem that arises with this increasing demand is the escalating costs that are imposed on service providers as the amount of data they need to maintain grows, particularly since it is often necessary to maintain multiple copies of data in order to ensure reliability. In addition, users are increasingly expecting to be able to access their data in a variety of different forms and formats, and not simply in the form or format in which the data was originally stored.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An online or cloud service can enhance the features it offers to users by providing them with their remotely stored files and other data in a variety of different formats. For instance, a user may upload a series of photographs one-by-one, but may later wish to retrieve them as a single photo album (or vice versa). Accordingly, in one illustrative example, a service can provide a user not only with copies of the data they remotely store, but also with alternate renditions of the data they store. An alternate rendition refers to a copy of data which exists in some form such that the original data can be restored, reconstructed, re-created, or the like, from the copy. The rendition is created by a lossless transformation of the original data. For instance, a data file may be losslessly transformed by a compression algorithm to create a zip file. The zip file may serve as the alternate rendition of the data file that is stored instead of the data file itself, thereby saving storage capacity. Among its other advantages, storage of an alternate rendition can reduce the computational demands placed on the storage service when a user requests an alternate rendition instead of the original data. For instance, by initially storing a series of photographs that have been uploaded one-by-one as a photo album, which serves as the alternate rendition, the online or cloud service can readily deliver the photo album upon user request without the need to perform any complex and expensive computations or the like.

This Summary is provided to introduce a selection of concepts in a simplified form that are further described below in the Detailed Description. Elements or steps other than those described in this Summary are possible, and no element or step is necessarily required. This Summary is not intended to identify key features or essential features of the claimed subject matter, nor is it intended to be used as an aid in determining the scope of the claimed subject matter. The claimed subject matter is not limited to implementations that solve any or all disadvantages noted in any part of this document.

DETAILED DESCRIPTION

Figure 1:
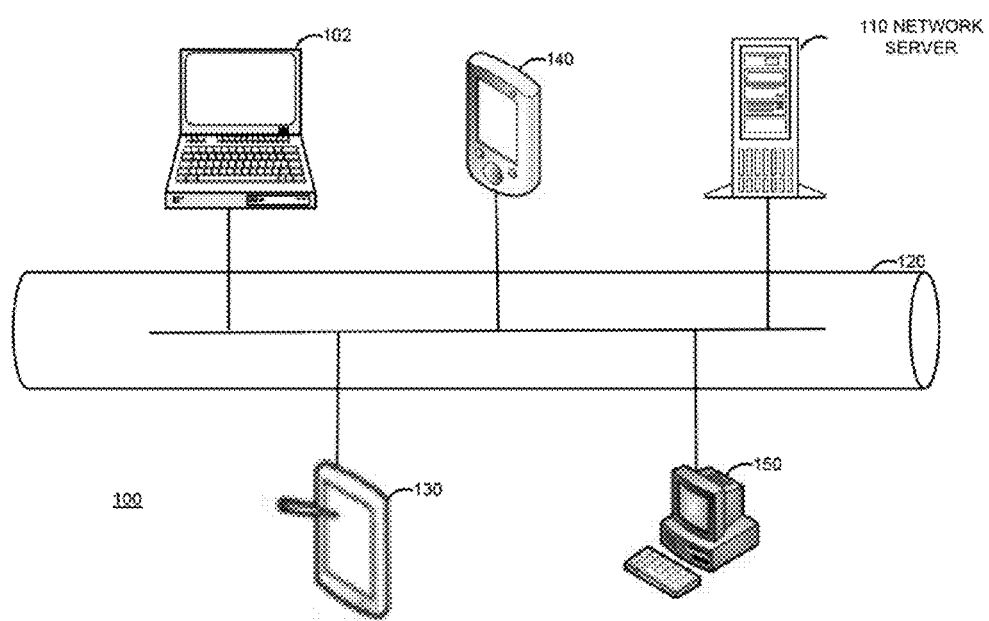
FIG. 1 is a block diagram illustrating an exemplary networking environment that includes a network server and several clients that communicate over a network.

FIG. 1 is a block diagram showing an example networking environment 100 including a network server 110 and several clients 120, 130, 140, and 150 coupled via a communications network 102. Such clients include, but are not limited to, computing systems, files servers, main frames, personal computers ("PCs"), laptop computers ("laptops"), tablet PCs, hand-held devices, portable devices, embedded devices, electronic devices, machines and systems including computing devices such as appliances, automobiles, etc., set-top boxes, or any device that includes some form of storage device that may benefit from the backup technologies described herein. Such devices generally include some form of file system that provides for creating, locating, accessing, and maintaining files, folders, directories, file system metadata, and the like. Such a file system may be part of an operating system and generally translates requests for file operations into low-level, sector- or cluster-oriented tasks that can be understood by the systems controlling a storage device.

Network 102 may be any type of communications mechanism providing for communications between server 110 and other devices on the network, such as client devices 120, 130, 140, and 150. Example communications mechanisms include wired networks including Ethernet, Universal Serial Bus ("USB"), FireWire, power line communication ("PLC"), and the like, as well as wireless networks including those using radio frequency ("RF"), infrared ("iR"), fiber optics and other light-based mechanisms, microwave links and the like, and other wireless mechanisms. Other examples include local area networks ("LANs"), wide area networks ("WANs"), storage area networks ("SANs"), metropolitan area networks ("MANs"), virtual private networks ("VPNs"), the Internet, and the like. Network 102 may also include a hardware bus internal to a device enabling the device to communicate between its own internal mechanisms, elements, storage devices, memory, and the like.

Client devices 120, 130, 140, and 150 as well as server 110 generally include, or are coupled to, some type of device or mechanism for storing digital information ("data"). Examples include any form of data storage device or mechanism, including, without limitation, a hard disk drive, solid state memory devices such as chips, cards, or sticks, magnetic tape, magnetic or optical disk, and the like. Another example storage device may include a plurality of devices, such as that provided by a redundant array of inexpensive disks ("RAID") or other array technologies or the like.

Network server 110 is employed to provide cloud-based services to the clients. Client data used and/or generated in connection with such services may also be remotely stored on the service provider's server or servers. Such data may include, but is not limited to, computer programs, applications, files, digital media, storage device content, memory content, user and/or machine settings, and any other type of information existing in a digitized format, whether that format is binary or otherwise. As previously mentioned, such on-line cloud services often maintain multiple copies of user data, a copy of which may or may not also reside on the client devices.

Figure 2:
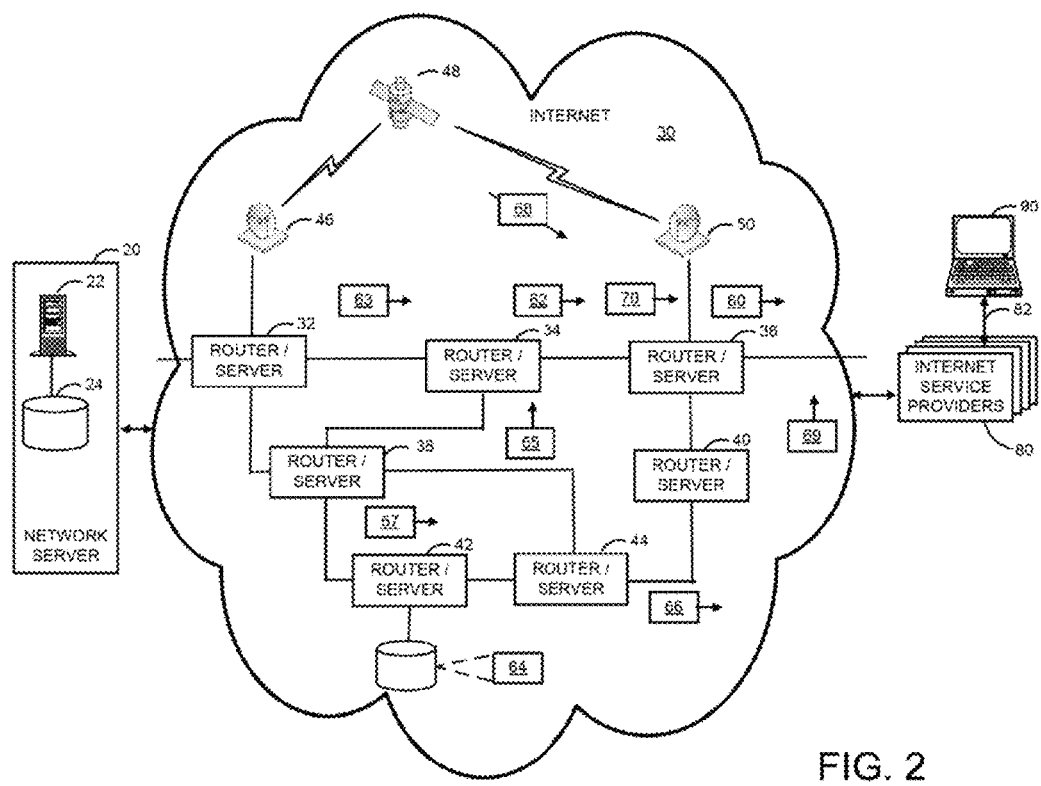
FIG. 2 is a block diagram illustrating another exemplary networking environment that includes a network server that delivers cloud services to a client over the Internet.

In one particular implementation communications network 102 is the Internet or other packet-based network and the network server 110 is representative of one or more network entities that execute one or more applications that provide on-line or cloud services to a client. FIG. 2 shows such a networking environment in which a client 90 and server 20 communicate over the Internet or any other packet-based network. The network server 20 generally includes one or more physical server computers 22 with one or more physical storage devices and/or databases 24.

The client 90 is connected, on line 82 in FIG. 2, to the Internet via one of many available Internet Service Providers ("ISPs") 80. Cloud 30 is labeled the Internet, but it is understood that this cloud represents that portion of the Internet 30 that does not include the server, the client's ISP, and the client. However, it should be noted that from the client's perspective the server 20 or other device or service with which the client communicates is often viewed as being inside the cloud.

Inside such a cloud are the routers, transmission lines, connections, and other devices that transmit data between clients and servers. For example, inside illustrative Internet cloud 30 are routers 32, 34, 36, 38, 40, 42, 44; two satellite dishes 46 and 50; and a satellite 48. These represent possible nodes that data packets may traverse between the server and the client. Illustrative data packets 60, 62, 63, 64, 65, 66, 67, 68, 69 and 70 are shown traversing the various nodes.

The client 90 acquires, creates, defines, or otherwise generates data using a client-based or Internet-based application or an application that is in part client-based and in part Internet-based. That is, the functionality of the application could be provided as part of a service or as a client-resident program. A simple illustrative example of such applications that will be referred to below is a photo album application. In addition, many other software applications may be used to generate and organize data, including, for example, financial software, desktop publishing software, database software, animation software, computer aided design ("CAD") software, blogging software and the like.

An alternative rendition of data is created when the data undergoes a lossless transform. One well-known example of a lossless transform is the compression of a data file to create a zip file. Another example of a lossless transform involves structured data. Structured data refers to data that has been organized in accordance with a schema. A "schema" generally comprises a set of rules that define how data is to be organized. The schema provides structure and context to the underlying data. Schemas vary depending on the type of data they are intended to organize, e.g., an email-inbox-related schema organizes data differently from a schema that organizes a user's favorite websites, which organizes data differently from a schema that organizes a photo album. Applying different schemas to the same data can create different renditions of the data through a lossless transformation process. In the case of a photo album, for instance, the different renditions may allow the data to be viewed in different ways. For example, a series of photographic data may be visually presented horizontally on a webpage when one schema is applied to the data, and vertically when another schema is applied. In other words, in one example two renditions of a structured data file may include the same underlying data but will differ in the manner in which they are organized. In another example, two renditions of structured data file may include both the same underlying data and the same schema, but they may each have a different representation (e.g., XML and JSON).

Network server 110 shown in FIG. 1 can not only provide users with copies of the data they have stored, but also with alternate renditions of the data. For instance, as previously mentioned, a user may store a series of photographs one-by-one, but may later wish to retrieve them as a single photo album. Even further, the user may wish to retrieve the single photo album as a zip file. The cloud service can provide these various renditions by performing the appropriate lossless transform on the copy of the data when the request is made by user. Alternatively, to avoid the need to perform the lossless transformation in real-time or near-real time, the service may pre-generate and store some of the more commonly requested renditions. While the server 110 may implement either or both of these alternatives, each of them have drawbacks. The former imposes significant computational demands on the system while the latter increases the amount of storage space that is required. Both of these problems become exacerbated as the number of potential renditions increases.

To overcome these problems, in some implementations the network server 110 may store a small number (e.g., one) of lossless transforms of the data that is being stored instead of a copy of the data. In other words, the network server 110 may store an alternate rendition of the data instead of a copy of the data. The rendition or renditions that are stored may be those that the system anticipates will be most commonly requested. Alternatively, the rendition or renditions that are stored may be determined by other criteria. For instance, the rendition that is stored may be a rendition that minimizes the amount of storage space that is required. In another example, the rendition that is stored may be a rendition from which other renditions can be derived by lossless transformations with minimal computational demands, even if the stored rendition itself is not one that is likely to be requested by the user.

In yet another implementation the rendition or renditions that are stored may be those that require the most computational overhead to generate, thereby avoiding the need to generate them in real-time when requested by the user. In some of the implementations described above the network server may store a copy of the data as well as one or more renditions.

Figure 3A:
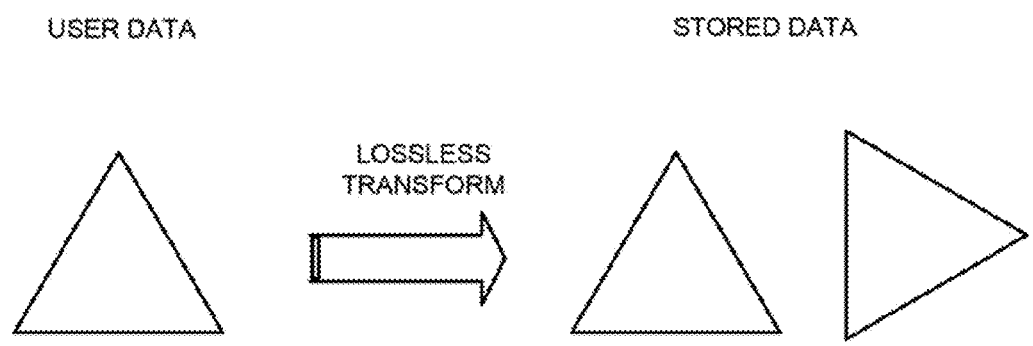
FIGS. 3a and 3b summarize, in symbolic form, examples of representational formats in which user data may be stored.
Figure 3B:
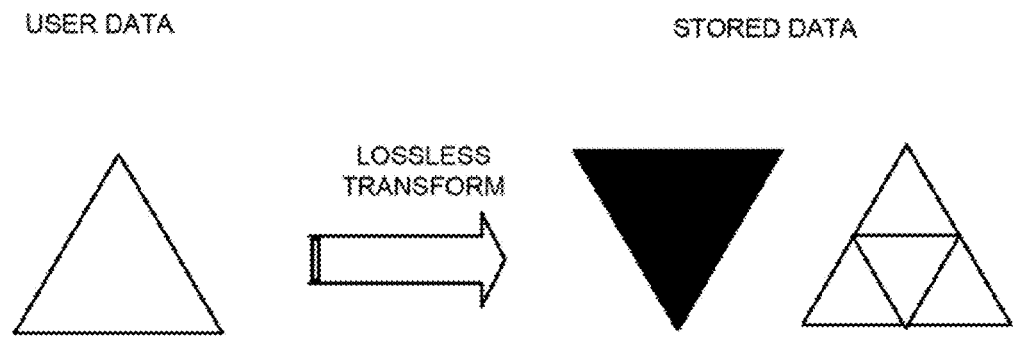

FIGS. 3a and 3b symbolically summarize the various embodiments described above. Original user data is represented by a triangle and is shown on the left-hand portion of the figures. The data that is stored on the network server is shown on the right-hand portion of the figures. In FIG. 3a two different lossless transforms of the user data has been stored. The first, represented by a triangle oriented in the same position as the triangle representing the user data, is a copy of the user data. The second is a lossless transform of the user data and is represented by a triangle that is rotated by 90°. Thus, in FIG. 3a one copy and one alternate rendition of the user data have been stored.

In FIG. 3b the triangle representing the user data may be thought of as a composite of photographs. In this example two renditions of the user data are stored on the network server. The first rendition, represented by a shaded triangle that is rotated by 180° relative to the user data, is a negative of the user data. The second rendition, represented by a triangle that is subdivided into smaller triangles, is a series of the individual photographs that form the composite of photographs in the user data. In this way the user can retrieve any desired individual photographs from the network server instead of the entire composite. Moreover, because the composite photograph has already been transformed into the individual photographs, the network server can provide the user with the desired photograph or photographs without performing any additional calculations.

Figure 4:
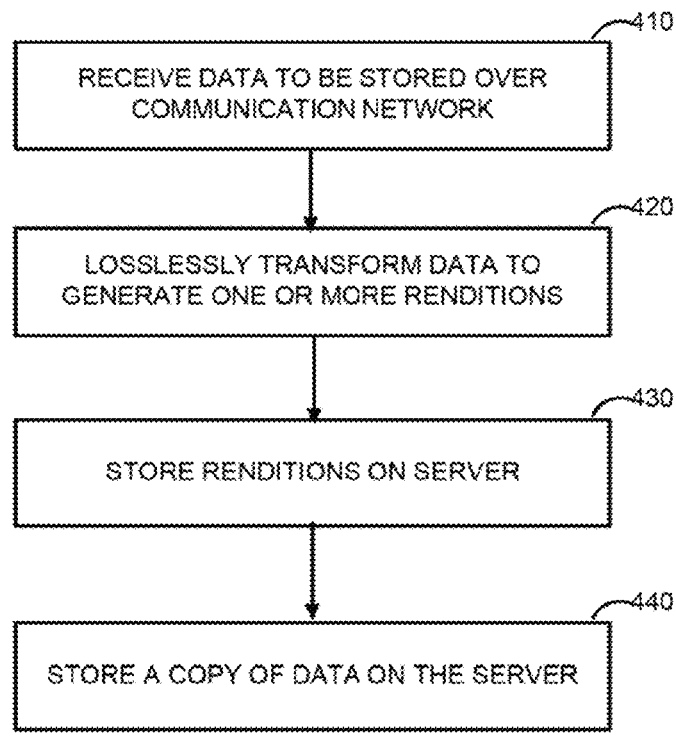
FIG. 4 is a flowchart showing one example of a method for storing user data provided by a client.

FIG. 4 is a flowchart showing one example of a method for storing user data on a network server. The method begins in step 410 when data to be stored is received from the client by a network server. The data may be received over a communications network such as the Internet or the like. Next, in step 420, the data undergoes one or more lossless transformations to thereby generate one or more alternate renditions from which the data can be restored, reconstructed, or re-created in its original form. The lossless transformation may be generated at any appropriate time. For instance, it may be transformed when it is first received, when a particular transformation is requested by the user, or when the server load is low. The rendition or renditions are then stored by the network server in step 430. Optionally, the network server may also store a copy of the data in step 440.

Figure 5:
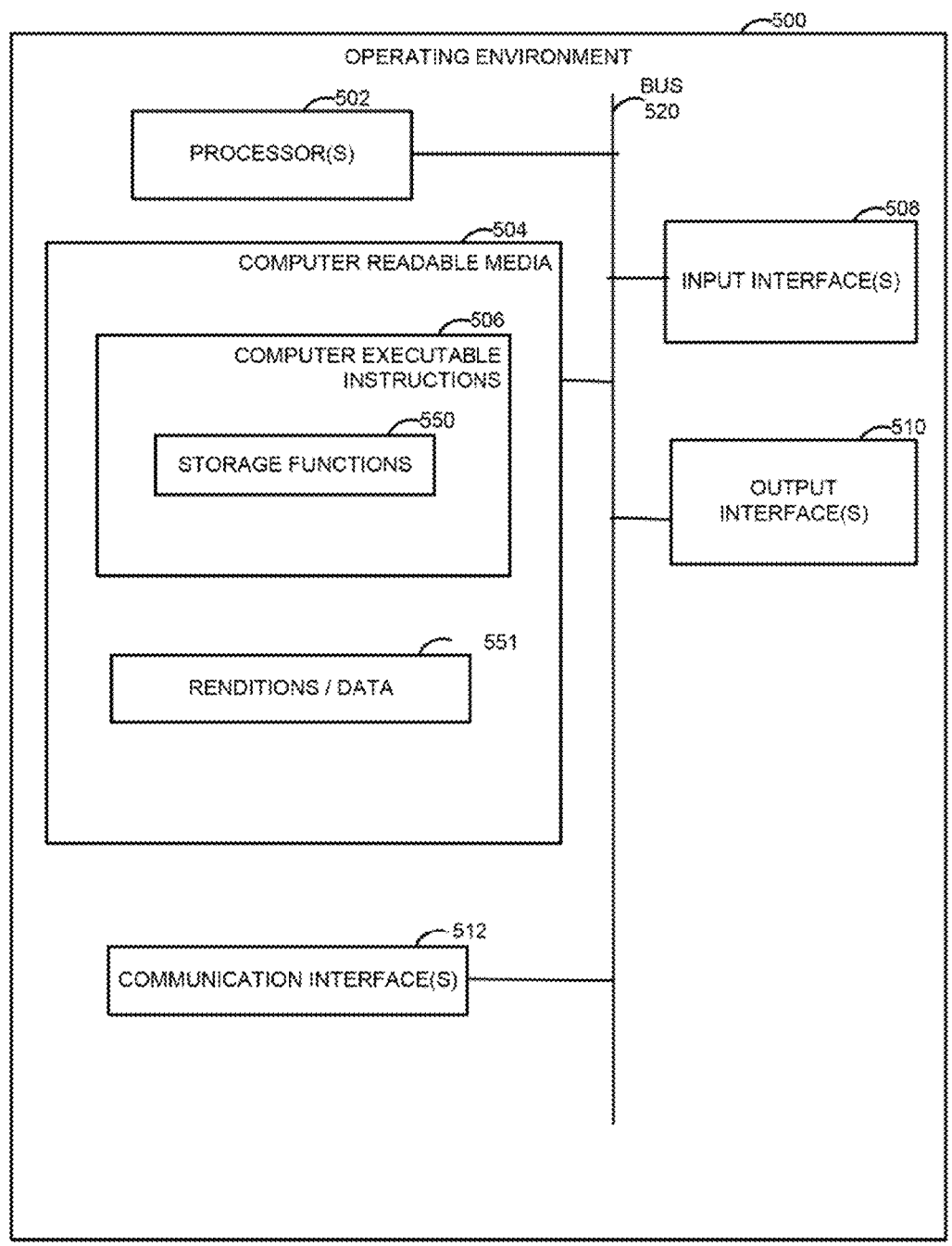
FIG. 5 is a simplified functional block diagram of an exemplary operating environment in which aspects of the cloud service(s) and/or methods described herein may be implemented or used.

FIG. 5 is a simplified functional block diagram of an exemplary operating environment 500 in which aspects of the cloud service(s) and/or methods described herein may be implemented or used. Operating environment 500 is only one example of a suitable operating environment and is not intended to suggest any limitation as to the scope of use or functionality of the systems or methods described herein. For example, operating environment 500 may be a type of computing device, such as a client-side computing device, or a network-based server or service.

One or more communication media 520 may be used to carry data, addresses, messages, control signals, and other information within, to, or from operating environment 500 and/or elements thereof. A processor 502 is responsive to computer-readable media 504 and to computer-executable instructions 506. Processor 502, which may be a real or a virtual processor, controls functions of an electronic device by executing computer-executable instructions. Processor 502 may execute instructions at the assembly, compiled, or machine-level to perform a particular process. Such instructions may be created using source code or any other known computer program design tool.

Computer-readable media 504 represent any number and combination of local or remote devices, in any form, now known or later developed, capable of recording, storing, or transmitting computer-readable data, such as the instructions executable by processor 502, or stored data 551. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 504 may also include transmission media and data associated therewith. Examples of transmission media/data include, but are not limited to, data embodied in any form of wireline or wireless transmission, such as packetized or non-packetized data carried by a modulated carrier signal.

Computer programs 506, such as backup functions 550, represent any signal processing methods or stored instructions that electronically control predetermined operations on data. In general, computer-executable instructions 506 are computer programs implemented as software components according to well-known practices for component-based software development, and encoded in computer-readable media (such as computer-readable media 504). Computer programs may be combined or distributed in various ways.

Functions/components described herein are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of operating environment 500.

Input interface(s) 508 provide input to operating environment 500. Input may be collected using any type of now known or later-developed interface, such as a user interface. Examples of input interfaces include but are not limited to remote controls, displays, mice, pens, styluses, trackballs, keyboards, microphones, scanning devices, and all types of devices that are used input data.

Output interface(s) 510 provide output from operating environment 500. Examples of output interface(s) 510 include but are not limited to displays, printers, speakers, drives, and the like.

Communication interface(s) 512 are available to enhance the ability of operating environment 500 to receive information from, or to transmit information to, another entity via a communication medium such as a channel signal, a data signal, or a computer-readable medium. External communication interface(s) 512 may be, or may include, elements such as cable modems, data terminal equipment, media players, data storage devices, personal digital assistants, or any other device or component/combination thereof, along with associated network support devices and/or software or interfaces.

It will be understood that all of the aspects of the subject matter described herein need not be used in a particular implementation, nor must the aspects, when used, be present concurrently. Functions/components described herein as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for delivering a cloud service to a client, comprising:
    receiving data from the client to be used in connection with the cloud service that is delivered to the client, the data from the client having an initial representational format, wherein said data has not been previously subjected to a compression technique causing data loss;
    applying a predetermined lossless transform to the data received from the client, to form at least one alternate rendition of the data received from the client, the least one alternate rendition having a predetermined representational format different from the initial representational format;
    storing the at least one alternate rendition of the data;
    receiving a user request to retrieve the data in a specified rendition;
    accessing the at least one alternate rendition;
    generating the specified rendition based on the at least one alternate rendition; and
    forwarding the specified rendition of the data to the client.

2. The method of claim 1 further comprising storing a copy of the data in addition to the alternate rendition.

3. The method of claim 1 wherein at least one alternate rendition comprises a plurality of different renditions, wherein the data can be restored, reconstructed, or re-created in its original form from any one of the different renditions or a combination of the different renditions.

4. The method of claim 1 further comprising selecting a representational format for the at least one alternate rendition that is stored.

5. The method of claim 4 wherein selecting the representational format includes selecting a representational format anticipated to be most commonly requested by a user for subsequent retrieval.

6. The method of claim 4 wherein selecting the representational format includes selecting a representational format based at least in part on its computational complexity.

7. The method of claim 1 wherein the data includes structured data having underlying data organized in accordance with a first schema and the alternate rendition includes the underlying data organized in accordance with a second schema.

8. The method of claim 7 wherein the data includes structured data having a first representation and the alternate rendition includes the structured data having a second representation.

9. The method of claim 1 further comprising delivering to the client a cloud service in which the data is utilized and/or generated.

10. An operating environment for delivering a cloud service to a client, comprising:
    a computer-readable storage medium; and
    a processor responsive to the computer-readable storage medium and to a computer program, the computer program, when loaded into the processor, operable to perform a method comprising;
        receiving data from the client to be used in connection with the cloud service that is delivered to the client, the data from the client having an initial representational format, wherein said data has not been previously subjected to a compression technique causing data loss,
        applying a predetermined lossless transform to the data received from the client, to form an alternate rendition of the data received from the client, the alternate rendition having a predetermined representational format different from the initial representational format;
        storing the alternate rendition,
        receiving a user request to retrieve the data in a specified rendition,
        accessing the alternate rendition,
        generating the specified rendition based on the alternate rendition, and
        forwarding the specified rendition of the data to the client.

11. The operating environment of claim 10 further comprising storing a copy of the data in addition to the alternate rendition.

12. The operating environment of claim 10 wherein at least one alternate rendition comprises a plurality of different renditions, wherein the data can be restored, reconstructed, or re-created in its original form from any one of the different renditions or a combination of the different renditions.

13. The operating environment of claim 10 further comprising selecting a representational format for the at least one alternate rendition that is stored.

14. The operating environment of claim 13 wherein selecting the representational format includes selecting a representational format anticipated to be most commonly requested by a user for subsequent retrieval.

15. The operating environment of claim 13 wherein selecting the representational format includes selecting a representational format based at least in part on its computational complexity.

16. The operating environment of claim 10 wherein the data includes structured data having underlying data organized in accordance with a first schema and the alternate rendition includes the underlying data organized in accordance with a second schema.

17. The operating environment of claim 16 wherein the data includes structured data having a first representation and the alternate rendition includes the structured data having a second representation.

18. The operating environment of claim 10 further comprising delivering to the client a cloud service in which the data is utilized and/or generated.

\* \* \* \* \*